(12) United States Patent
Kokuryo et al.

(10) Patent No.: US 7,703,689 B2
(45) Date of Patent: Apr. 27, 2010

(54) SUPPORT SYSTEM FOR RECYCLING GLASS MATERIAL

(75) Inventors: Kazuto Kokuryo, Shiga (JP); Shohei Ohara, Tokyo (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 1015 days.

(21) Appl. No.: 11/383,806

(22) Filed: May 17, 2006

(65) Prior Publication Data

US 2006/0261163 A1   Nov. 23, 2006

(30) Foreign Application Priority Data

May 17, 2005   (JP)   ............... P2005-144771

(51) Int. Cl.
*G06K 19/06* (2006.01)
(52) U.S. Cl. ............... 235/492; 209/930; 705/28
(58) Field of Classification Search ............... 235/492; 705/28
See application file for complete search history.

(56) References Cited

U.S. PATENT DOCUMENTS

| | | | | |
|---|---|---|---|---|
| 5,425,456 A | * | 6/1995 | Erickson | ............... 209/2 |
| 5,465,822 A | * | 11/1995 | DeWoolfson et al. | ............... 194/209 |
| 5,960,402 A | * | 9/1999 | Embutsu et al. | ............... 705/1 |
| 2004/0133484 A1 | * | 7/2004 | Kreiner et al. | ............... 705/28 |
| 2005/0216369 A1 | * | 9/2005 | Honegger | ............... 705/28 |

FOREIGN PATENT DOCUMENTS

JP   2004-35351   2/2004

* cited by examiner

*Primary Examiner*—Michael G Lee
*Assistant Examiner*—Kristy A Haupt
(74) *Attorney, Agent, or Firm*—Whitham Curtis Christofferson & Cook, PC

(57) ABSTRACT

A support system for recycling a glass material to which an electronic tag is attached, having a storing device for storing information about plural types of glass materials corresponding to plural glass material identification data that are stored in electronic tags attached to glass materials, a reading device for reading a glass material identification data from an electronic tag that is attached to a discarded glass material, a determining device for determining a particular type of the discarded glass material based on the glass material identification data read by the reading device by referring to information about the types of glass materials stored in the storing device, and a displaying device for displaying the type of the discarded glass material.

7 Claims, 11 Drawing Sheets

FIG. 6

| GLASS MATERIAL ID | TYPE | TYPE OF INNER PANEL | TYPE OF OUTER PANEL | TYPE OF INTERLAYER FILM | ELEMENT PLATE | TYPE OF ENCAPSULATION |
|---|---|---|---|---|---|---|
| 00001 | LAMINATED GLASS A | IR CUT | IR CUT | NOISE INSULATION | - | - |
| 00002 | LAMINATED GLASS B | UV CUT | IV CUT | UV CUT | - | - |
| 00003 | TEMPERED GLASS | - | - | - | IR CUT | - |
| 00004 | ENCAPSULATED TEMPERED GLASS | - | - | - | UV CUT | PVC |
| ... | ... | ... | ... | ... | ... | ... |

FIG. 7

| TYPE | WEIGHT OF REQUIRED CULLET | WEIGHT OF ENSURED CULLET | EXPECTED DEADLINE |
|---|---|---|---|
| LAMINATED GLASS A | 5 TONS | 4 TONS | 2005/6/1 |
| LAMINATED GLASS B | 3 TONS | 3 TONS | 2005/6/20 |
| ⋮ | ⋮ | ⋮ | ⋮ |

SUPPORT SYSTEM FOR RECYCLING GLASS MATERIAL

BACKGROUND OF THE INVENTION

1. Field of the Invention

The present invention relates to a support system for recycling glass material.

2. Related Art

Recently, in view of environmental preservation, in a recycling based society, a demand to use resources for effectively reducing waste has increased. The recycling may be applied to glass material, such as a window of an automobile or a window of a building or structure. It is possible to reuse discarded glass material (hereinafter, referred to as waste glass) that can no longer be used as a glass product for a window of an automobile or the like by remelting the discarded glass. However, most conventional waste glass is generally disposed as industrial waste; therefore the glass is scarcely recycled to become new glass raw material.

In order to prevent waste glass from being disposed as industrial waste, a technique in which waste glass incapable of being reused as glass raw materials is recycled into a material for public works is disclosed (see JP-A-2004-035351)

The reason why conventional waste glass is not generally recycled into new glass raw material is that glass does not characteristically recycle efficiently.

In general, glass includes silicon oxide, which is a main raw material, aluminum oxide, potassium oxide, calcium oxide, magnesium oxide, etc. Glass is graded based on its composition. For example, different types of glass having different functions, such as UV cut glass, and IR cut glass can be obtained by changing the composition.

When each component melts to form glass, it is difficult to extract each component from the glass. Therefore, when waste glass is used as a part of new glass raw material, it is impossible not to use a granular material so-called cullet that is obtained by pulverizing waste glass. In order to maintain the same high quality of glass, the composition of cullet should be compatible to that of the glass to be manufactured. The compatibility is especially important when a glass product, such as a window of an automobile which requires high quality control, is manufactured. For this reason, it is necessary to properly classify or separate waste glass according to its type in order to reuse waste glass as a part of the new glass raw material.

Even though each glass has similar transparency and color, each composition is not always compatible with each other; therefore, the composition of glass cannot be determined by appearance. For this reason, when various types of waste glass are collected, they cannot be properly classified or separated. Therefore, waste glass has been disposed as industrial waste.

For example, a front window of an automobile uses laminated glass in which a flexible and strong interlayer film is interposed between two sheets of flat glass. Even though the interlayer film used in the laminated glass is a material that can be reused as glass, the composition of the interlayer film cannot be determined by appearance as well as the composition of the glass; therefore, the interlayer film is disposed along with the glass.

SUMMARY OF THE INVENTION

The present invention has been made in view of the drawbacks inherent in the related art, and it is an object of the present invention to provide a technique for recycling glass materials to be reused as a part of glass raw materials by properly classifying and separating discarded glass material.

According to an aspect of the invention, a support system for recycling a glass material to which an electronic tag is attached, the support system comprising:

a first storing device for storing information about plural types of glass materials corresponding to plural glass material identification data that are stored in electronic tags attached to glass materials;

a reading device for reading a glass material identification data from an electronic tag that is attached to a discarded glass material;

a determining device for determining a particular type of the discarded glass material based on the glass material identification data read by the reading device by referring to information about the types of glass materials stored in the first storing device; and a displaying device for displaying the type of the discarded glass material.

In this structure, 'glass material' is not limited to a specific type of glass, it may include at least one selected from various types of glass, such as single-panel glass, laminated glass, tempered glass, double glass, encapsulated single-panel glass, and encapsulated tempered glass.

According to this aspect of the invention, since the type of waste glass is determined for each waste glass, the recycling producer can easily classifies and separates waste glass. By this, it is facilitated to reuse waste glass as a part of raw materials of glass materials that are newly produced. In addition, since waste glass is reliably classified and separated, glass materials of different composition are prevented from being mixed; therefore, the quality of glass material is improved.

In the second aspect of the invention, the support system for recycling glass material may further include: a second storing device for storing a manufacturing plan of the glass materials which contains demand information on cullets that are used as raw materials of the glass materials;

an obtaining device for obtaining a demand information on a cullet that is used as a raw material in the particular type of the discarded glass material by referring to the second storing device; and a displaying device for displaying the demand information on the cullet to be produced from the particular type of the discarded glass material.

According to this aspect of the invention, since the recycling producer provides information about whether waste glass brought by the recycling producer is marketable or unmarketable, the glass material can be smoothly recycled without waste.

In the third aspect of the invention, the support system may further include: a displaying device for displaying a weight of a required cullet as the demand information of the cullet to be produced from the particular type of the discarded glass material;

an inputting device for inputting the weight of the cullet to be produced from the particular type of the discarded glass material; and an updating device for updating the weight of the required cullet based on the weight of the cullet to be produced in the second storing device, wherein the second storing device stores weights of required cullets that are to be delivered for each of the glass materials.

According to this aspect of the invention, the weight of cullet to be delivered is changed according to the weight of cullet to be produced by the recycling producer; therefore, the weight of cullet to be delivered can be exactly perceived, which leads to a better management of recycling glass.

In the fourth aspect of the invention, the support system for recycling glass material may further include: a displaying device for displaying when the cullet should be delivered as a demand information of the cullet to be produced from the particular type of the discarded glass material, wherein the second storing device stores when the cullet should be delivered for each of the glass materials According to this aspect of the invention, the recycling producer can plan when to produce cullet in accordance with the desired deadline, which leads to a better management of recycling glass.

In the fifth aspect of the invention, the support system for recycling glass may further include: a receiving device for receiving an information about manufacturing plan for each of the glass materials; and an updating device for updating the demand information by a cullet that is used as the raw material in the second storing device, based on the information about the manufacturing plan received by the receiving device.

According to this aspect of the invention, the manufacturing plan about glass material for each type is exactly calculated.

In the sixth aspect of the invention, the glass material may be for a window of an automobile.

According to this aspect of the invention, it is facilitated to recycle glass material for windows of automobiles that have been discarded.

In addition, a structure in which the above-described components are properly combined can be within the scope of the invention.

According to the invention, it is possible to easily classify and separate discarded glass materials, which improves efficiency of recycling glass materials.

BRIEF DESCRIPTION OF THE DRAWINGS

FIG. 6 is a diagram showing data examples stored in a glass material database.

FIG. 7 is a diagram showing data examples stored in a glass material manufacturing plan database.

DETAILED DESCRIPTION OF THE PREFERRED EMBODIMENTS

Hereinafter, an embodiment of the present invention will be described with reference to the accompanying drawings. In the present embodiment, a system for recycling glass material to be used in a front window, a side window, a rear window, etc. of an automobile is exemplified, but the application of the system for recycling glass material of the present invention is not limited to the recycling glass material to be used only in an automobile, the system can be applied to general glass material to be used in an window of a house, for example.

Figure 1:
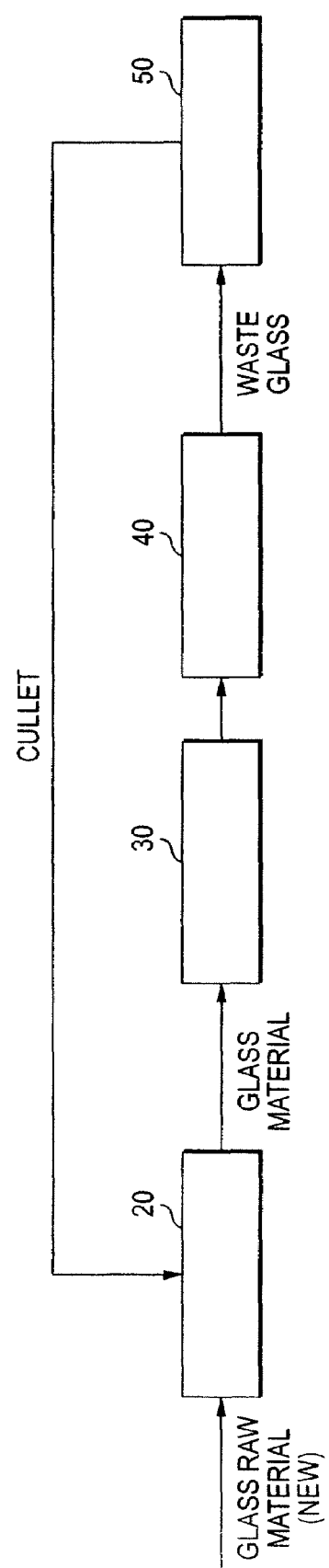
FIG. 1 is a diagram showing a process of recycling glass to which a system for recycling glass according to an embodiment is applied.

FIG. 1 is a diagram showing a process of recycling glass to which a system for recycling glass according to an embodiment is applied.

A manufacturer 20 manufactures glass material by the following processes of melting, molding, and slow-cooling glass raw materials that are newly introduced and cullet brought by a recycling producer 50. Subsequently, cutting and cleaning are performed on the glass material if necessary, and then glass for an automobile which meets test requirements is shipped. The type of glass material includes laminated glass, tempered glass, and encapsulated tempered glass. Glass can be variously classified according to grades and functions of glass.

The manufacturer 20 ships glass material while an IC tag, which is a type of an electronic tag, is attached to the glass material. The IC tag can be read by radio transmission, and a batteryless RFID (radio-frequency identification) tag is suitable. The IC tag used in the present embodiment is an ROM type tag for reading only, and a glass material ID that identifies glass material is recorded in the IC tag. The method of attaching the IC tag can adopt any attaching method as long as the IC tag is fixed on the glass material. For example, the IC tag may be bonded onto the surface of the glass material. When the glass material is laminated glass, the IC tag may be embedded in the interlayer film.

The manufacturer 20 temporarily attaches another writable IC tag besides the ROM type IC tag on the surface of the glass material. Information about the type of glass material is written on the writable IC tag. After the information about the type of glass material written on the writable IC tag, when the glass material is shipped, is read, and then is registered in the glass material database to be described below. The writable IC tag is detached from the glass material when the glass material is shipped, and record contents of the IC tag is erased, and then the IC is reused when another glass material is manufactured.

Figure 2:
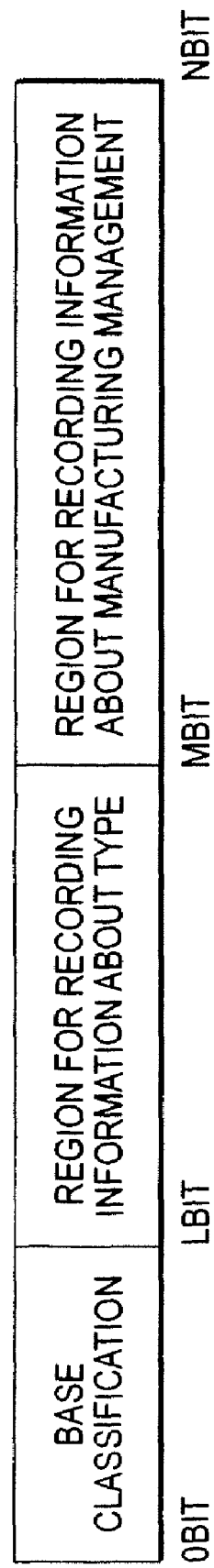
FIG. 2 is a diagram showing a data structure recorded in a writable IC tag according to the embodiment.

FIG. 2 is a diagram showing a data structure recorded in the writable IC tag. Information about a base classification of the glass material is recorded in a region from 0 bit to (L−1) bit. The base classification of the glass material is composed of laminated glass, tempered glass, encapsulated tempered glass. Information about the type of glass material is recorded in a region from L bit to (M−1) bit. As for the laminated glass, the information of the type of glass material includes a part number, a type of outer panel, a type of inner panel, a thickness pattern of an outer panel and an inner panel, a configuration of an interlayer film, a type of interlayer film, and a brand of an interlayer film. As for the tempered glass, the information about type of glass material includes a part number, a type of element plate, and a thickness pattern of an element plate. As for the encapsulated tempered glass, the information of the type of glass material includes a part number, a type of element plate, a thickness of an element plate, and a type of encapsulation. Preferably, information about the manufacturing management of the glass material is recorded in a region from M bit to N bit. The information about the manufacturing management of the glass material includes a date of manufacture, a manufacturing factory.

Returning to FIG. 1, the glass material manufactured by the manufacturer 20 is delivered to an automobile maker 30, and is then assembled into a part for a window of an automobile. An automobile manufactured by the automobile maker 30 is sold to a consumer 40 and then used. When the automobile possessed by the consumer is disposed of, or when the glass material falls apart from the automobile due to damage and deterioration, the recycling producer 50 is notified of the discarded glass material. The recycling producer 50 reads the glass material ID from the IC tag, and separates or classifies the waste glass by using the system for recycling glass, and then produces cullet by pulverizing the waste glass. At this time, if the waste glass is laminated glass, an interlayer film extracted from the waste glass is also classified or separated by using the system for recycling glass. In the same manner, if the waste glass is encapsulated tempered glass, encapsulation extracted from the waste glass is also classified or separated by using the system for recycling glass.

The cullet generated by the recycling producer 50, the interlayer film, and encapsulation that are classified and separated according to the composition are delivered to the manufacturer 20. The manufacturer 20 reuses the delivered cullet as a part of the glass raw materials. Further, as the manufacturer 20 performs a process of dissolving the recovered interlayer film and encapsulation into organic solvent the recovered interlayer film and encapsulation can be reused.

The system for recycling glass easily classifies and separates the waste glass, and helps in reusing the waste glass as a part of the raw material for glass material to be newly manufactured. Since the waste glass is reliably classified and separated by the system for recycling glass, glass materials having different composition are prevented from being mixed; therefore, the quality of glass material is improved.

Figure 3:
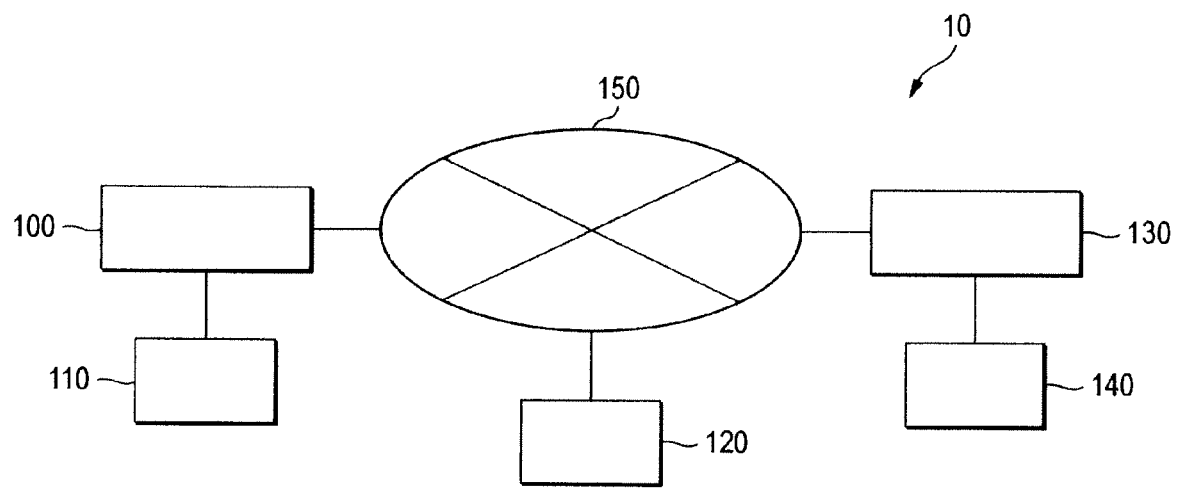
FIG. 3 is a schematic diagram showing the system for recycling glass according to the embodiment.

FIG. 3 is a schematic diagram showing the system for recycling glass according to the embodiment. A system 10 for recycling glass includes a terminal equipment 100 of the manufacturer, a reader/writer 110, a device 120 for recycling glass, a terminal equipment 130 of the recycling producer, a reader 140, and a communication network 150. The terminal equipment 100 of the manufacturer, the device 120 for recycling glass, and the terminal equipment 130 of the recycling producer are connected to each other by the communication network 150. For example, the internet or a LAN (Local Area Network) can be used as the communication network 150.

The reader/writer 110 can read a glass material ID from the ROM type IC tag attached to the glass material. Further, the reader/writer 110 can write data on the writable IC tag that is temporarily attached to the glass material. The reader/writer 110 may be a portable type or a stationary type. The reader 140 can read the glass material ID from the ROM type IC tag attached to the glass material. The reader 140 may be a portable type or a stationary type.

In the present embodiment, the system includes one terminal equipment 100 for the manufacturer and one terminal equipment 130 for the recycling producer, respectively; however, the system may include a plurality of terminal equipments for those producers. Even though the terminal equipment 100 of the manufacturer and the device 120 for recycling glass are separated from each other in the system according to the present embodiment, the system may be configured such that the terminal equipment 100 and the device 120 can be combined into one unit.

Figure 4:
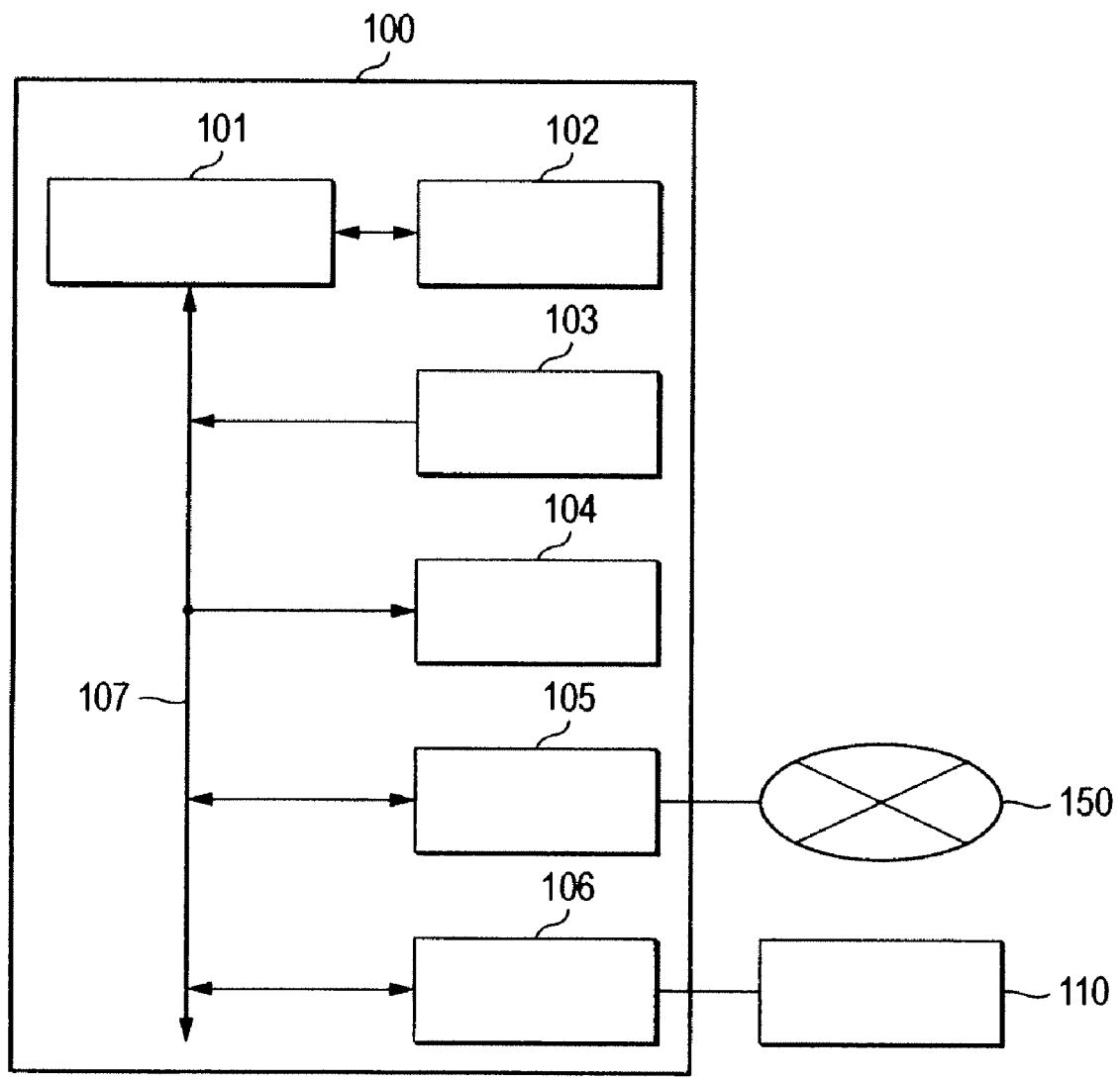
FIG. 4 is a block diagram showing a configuration of a terminal equipment of a manufacturer.

FIG. 4 is a block diagram showing the configuration of the terminal equipment of the manufacturer. The terminal equipment 100 of the manufacturer is installed in a factory which manufactures glass material, information about glass to be manufactured is supplied to the device 120 for recycling glass. The information about glass material includes a glass material ID assigned to the glass material, a type of glass material corresponding to the glass material ID, an amount of cullet required for each type of glass material, and a manufacturing plan with a hopeful deadline.

The terminal equipment 100 of the manufacturer includes a process unit 101, a storage unit 102, an input unit 103, an output unit 104, a network interface 105, and an external interface 106. The process unit 101, the storage unit 102, the input unit 103, the output unit 104, the network interface 105, and the external interface 106 are connected to each other through a bus 107 so as to transfer information.

The process unit 101 is a central processing unit (CPU) which controls the entire terminal equipment 100 of the manufacturer. The storage unit 102 permanently or temporarily stores programs to be executed in the terminal equipment 100 of the manufacturer or data to be processed. For example, a semiconductor memory, a hard disk device, an optical disk device, or the like may correspond to the storage unit 102.

The input unit 103 is used when a user inputs information to the terminal equipment 100 of the manufacturer. The input unit 103 may be, for example, a text input device (such as a keyboard), an image reading device (such as a scanner), a mouse, a pointing device (such as a track ball or a pointing pen), etc. The output unit 104 displays a user interface screen for supporting an operation performed by a user. The output unit 104 may be a CRT which displays an image on a screen or a crystalline liquid display, etc.

The network interface 105 uses a communication protocol, such as TCP/IP, so as to allow information to be exchanged between other devices connected to the communication network 150. The network interface 105 includes network connection equipments, such as a modem, a LAN board, and a hub.

The external interface 106 allows information to be exchanged with the reader/writer 110 which reads data of the IC tag attached to the glass material and rewrites. The external interface 106 may be, for example, a USB and a serial.

Figure 5:
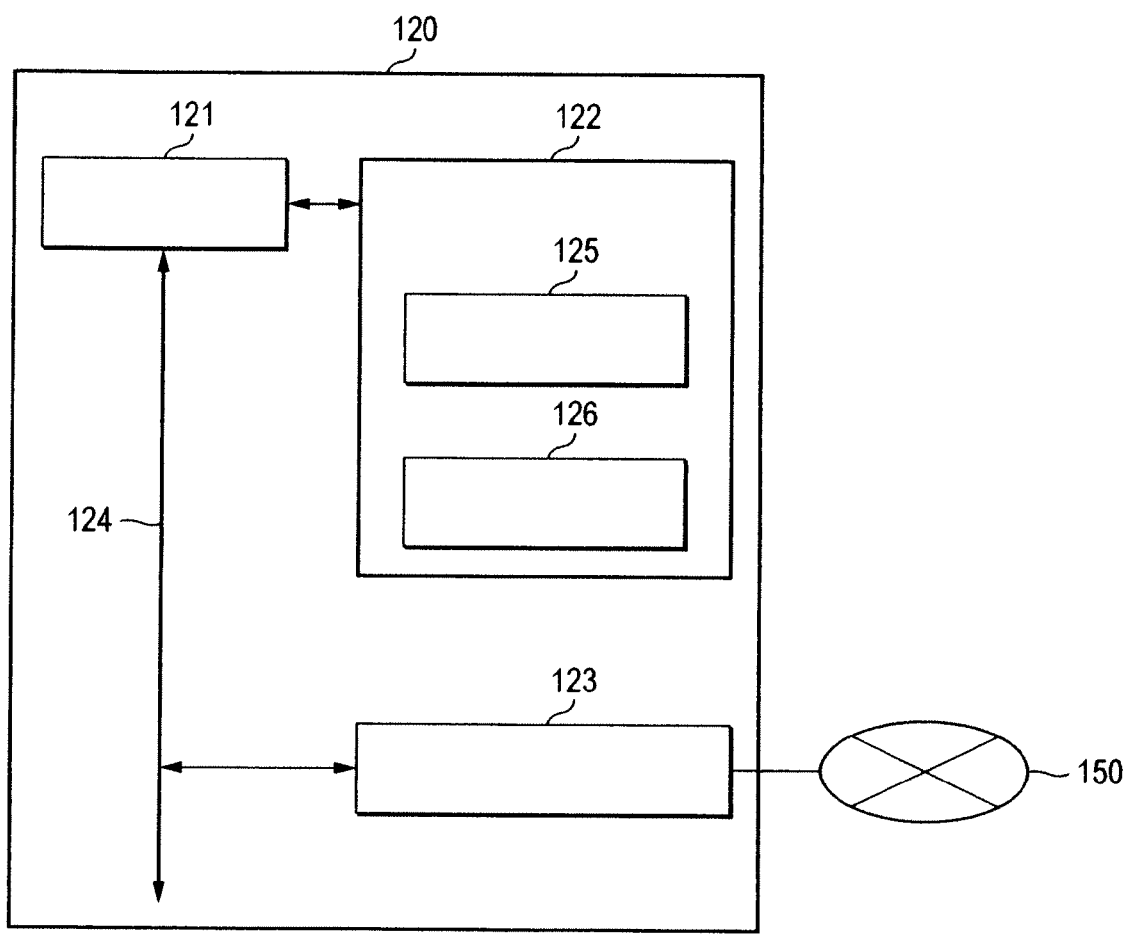
FIG. 5 is a block diagram showing a configuration of a device for recycling glass.

FIG. 5 is a block diagram showing the configuration of the device 120 for recycling glass. The device 120 for recycling glass is centrally disposed so as to manage glass recycling process, collects information about the glass material that is required for recycling the glass material, and provides information about recycling the glass material to the terminal equipment 130 of the recycling producer.

The device 120 for recycling glass includes a process unit 121, a storage unit 122, and a network interface 123. The process unit 121, the storage unit 122, and the network interface 123 are connected to each other through a bus 124 so as to transfer information.

The process unit 122 is a central processing unit (CPU) which controls the entire device 120 for recycling glass. The storage unit 122 permanently or temporarily stores programs to be executed in the device 120 for recycling glass or data to be processed. For example, a semiconductor memory, a hard disk device, an optical disk device, or the like may correspond to the storage unit 122.

The storage unit 122 includes a glass material database 125 and a glass material manufacturing plan database 126.

FIG. 6 is a diagram showing data examples stored in the glass material database 125. In the glass material database 125, the type of glass materials is stored corresponding to each of the glass materials ID identifying the glass material.

By referring to the glass material database 125 based on the glass material ID, the type of glass material is determined. As for laminated glass, the type of glass material is determined according to the type of inner panel, the type of outer panel, and the type of interlayer film. As for tempered glass, the type of glass material is determined according to the type of element plate. As for encapsulated tempered glass, the type of glass material is determined according to the type of element plate and the type of encapsulation.

FIG. 7 is a diagram showing data examples stored in the glass material manufacturing plan database 126. The glass material manufacturing plan database 126 stores information about demand for cullet for each of the glass materials. To be more specific, the information about demand for cullet includes the total weight of cullet required for each type of glass raw material, the weight of cullet already ensured for each type of glass raw material, and a date on which cullet must be delivered to the manufacturer.

Returning to FIG. 5, the network interface 123 enables information exchanges with other devices connected to the communication network 150 by using a communication protocol, such as TCP/IP. The network interface 123 includes network connection equipments, such as a model, a LAN board, and a hub.

Figure 8:
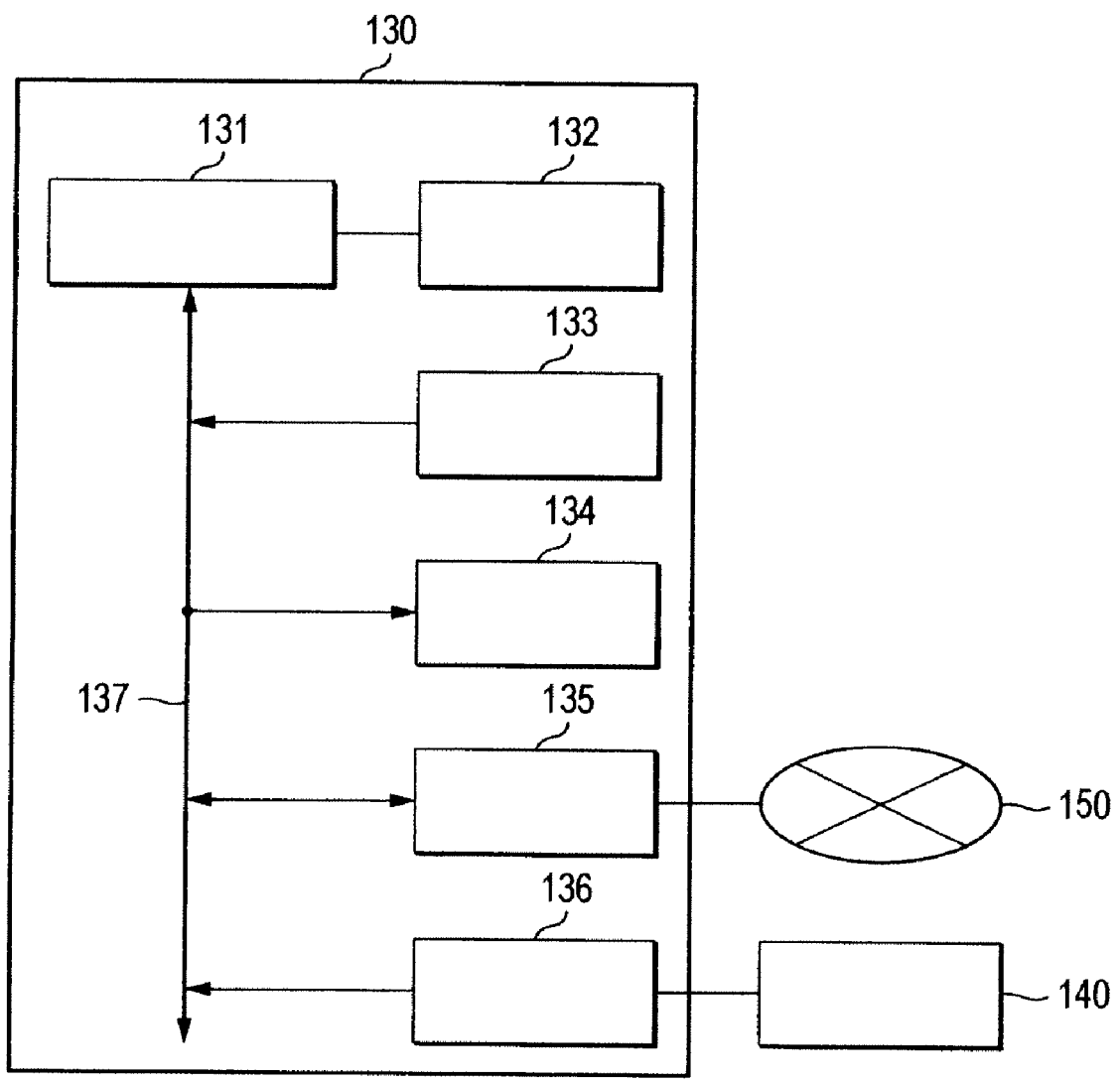
FIG. 8 is a block diagram showing a configuration of a terminal equipment of a recycling producer.

FIG. 8 is a block diagram showing the configuration of the terminal equipment 130 of the recycling producer. The terminal device 130 of the recycling producer is built in a factory which recycles glass, and receives information required for classifying or separating the waste glass from the device 120 for recycling glass, based on the glass material ID recorded in the IC tag attached to the waste glass.

The terminal device 130 of the recycling producer includes a process unit 131, a storage unit 132, an input unit 133, an output unit 134, a network interface 135, and an external interface 136. The process unit 131, the storage unit 132, the input unit 133, the output unit 134, the network interface 135, and the external interface 136 are connected to each other through a bus 137 so as to transfer information.

The process unit 131 is a central processing unit (CPU) which controls the entire terminal equipment 130 of the recycling producer. The storage unit 132 permanently or temporarily stores programs to be executed in the terminal equipment 130 of the recycling producer or data to be processed. For example, a semiconductor memory, a hard disk device, an optical disk device, or the like may correspond to the storage unit 132.

The input unit 133 is used when a user inputs information to the terminal equipment 100 of the manufacturer. The input unit 133 may be, for example, a text input device (such as a keyboard), an image reading device (such as a scanner), a mouse, a pointing device (such as a track ball or a pointing pen), etc. The output unit 134 displays a user interface screen for supporting an operation performed by a user. The output unit 134 may be a CRT which displays an image on a screen or a crystalline liquid display, etc.

The network interface 135 uses a communication protocol, such as TCP/IP, so as to allow information to be exchanged between other devices connected to the communication network 150. The network interface 135 includes network connection equipments, such as a modem, a LAN board, and a hub.

The external interface 136 allows information to be exchanged with the reader 140 capable of reading data of the IC tag attached to the waste glass. The external interface 136 may be, for example, a USB and a serial.

Hereinafter, a process of the system 10 for recycling glass according to the embodiment will be described.

(Process of Registering Information about Glass Material)

Figure 9:
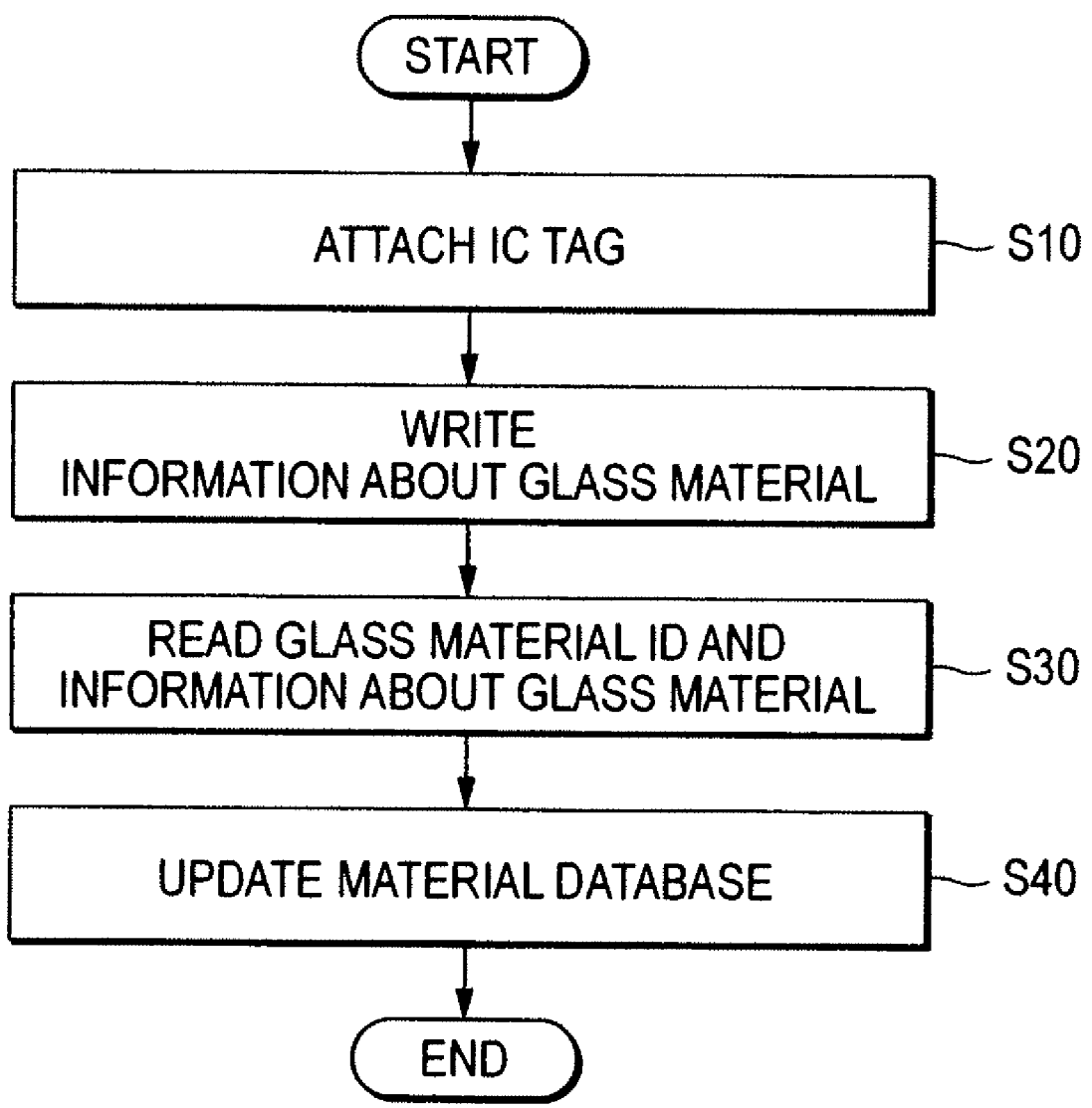
FIG. 9 is a flow chart showing a process of registering information about glass material in the glass material database.

FIG. 9 is a flow chart showing the process of registering information about glass material in the glass material database.

First, in manufacturing glass materials, the ROM type IC tag and the writable IC tag are attached to the glass material (S10). A unique ID is recorded in advance in the ROM type IC tag. The unique ID becomes a glass material ID for identifying glass material.

In manufacturing the glass material, base classification of the glass material, information about the type of glass material, and information about the manufacturing management of the glass material are written on the writable IC tag (S20).

The glass material ID recorded in the ROM type IC tag when the glass material is shipped is read by the reader/writer 110, and information about glass material, such as base classification of the glass material recorded in the writable IC tag, is read by the reader/writer 110, and the writable IC tag is detached from the glass material (S30). The writable IC tag detached from the glass material is attached to the glass material to be newly manufactured after initializing data.

The terminal equipment device 100 transmits the read glass material ID and information about glass material to the device 120 for recycling glass. The device 120 updates the glass material database 125 based on the received glass material ID and information about glass material (S40).

By performing the above-described process, glass material is individually identified by the glass material ID, and information about the type of each of the glass materials is referred to based on the glass material ID.

(Process of Registering Glass Material Manufacturing Plan)

Figure 10:
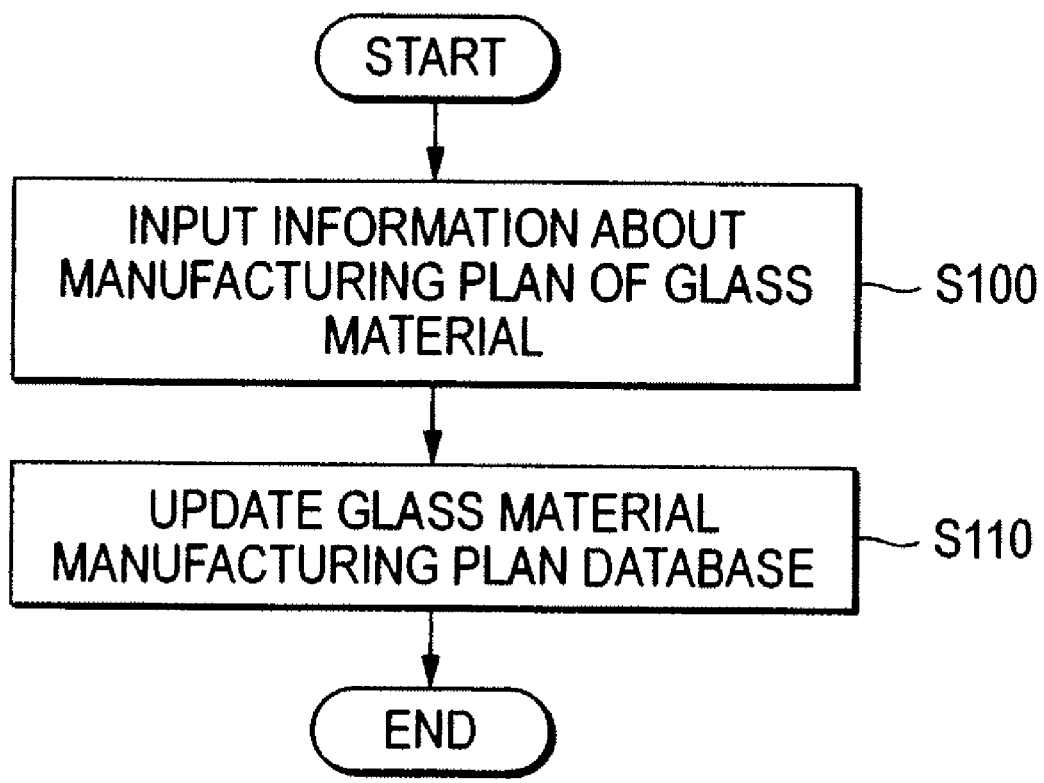
FIG. 10 is a flow chart showing a process of registering information about the glass material manufacturing plan in the glass material manufacturing plan database.

FIG. 10 is a flow chart showing the process of registering information about the glass material manufacturing plan in the glass material manufacturing plan database.

Information about the manufacturing plan of the glass material that has received an order or glass material that expects an order is input by using the input unit 103 (S100). The information about the manufacturing plan of the glass material includes a type of glass material to be manufactured, the weight of cullet to be used as the glass raw material, the weight of cullet already ensured for the glass raw material, and a date on which the cullet must be delivered.

The terminal equipment device 100 transmits the information about the manufacturing plan of the glass material input by the input unit 103 to the device 120. The device 120 updates glass material manufacturing plan database 126 based on the received information about the manufacturing plan of the glass material (S110).

By performing the above-described process, the manufacturing plan of each type of glass material is exactly calculated. By correctly recognizing the manufacturing plan of each type of glass material, the exact amount of cullet to be required for manufacturing the glass material is known to the recycling producer 50. Therefore, the glass material can be smoothly recycled without waste.

(Process for Recycling Waste Glass)

Figure 11:
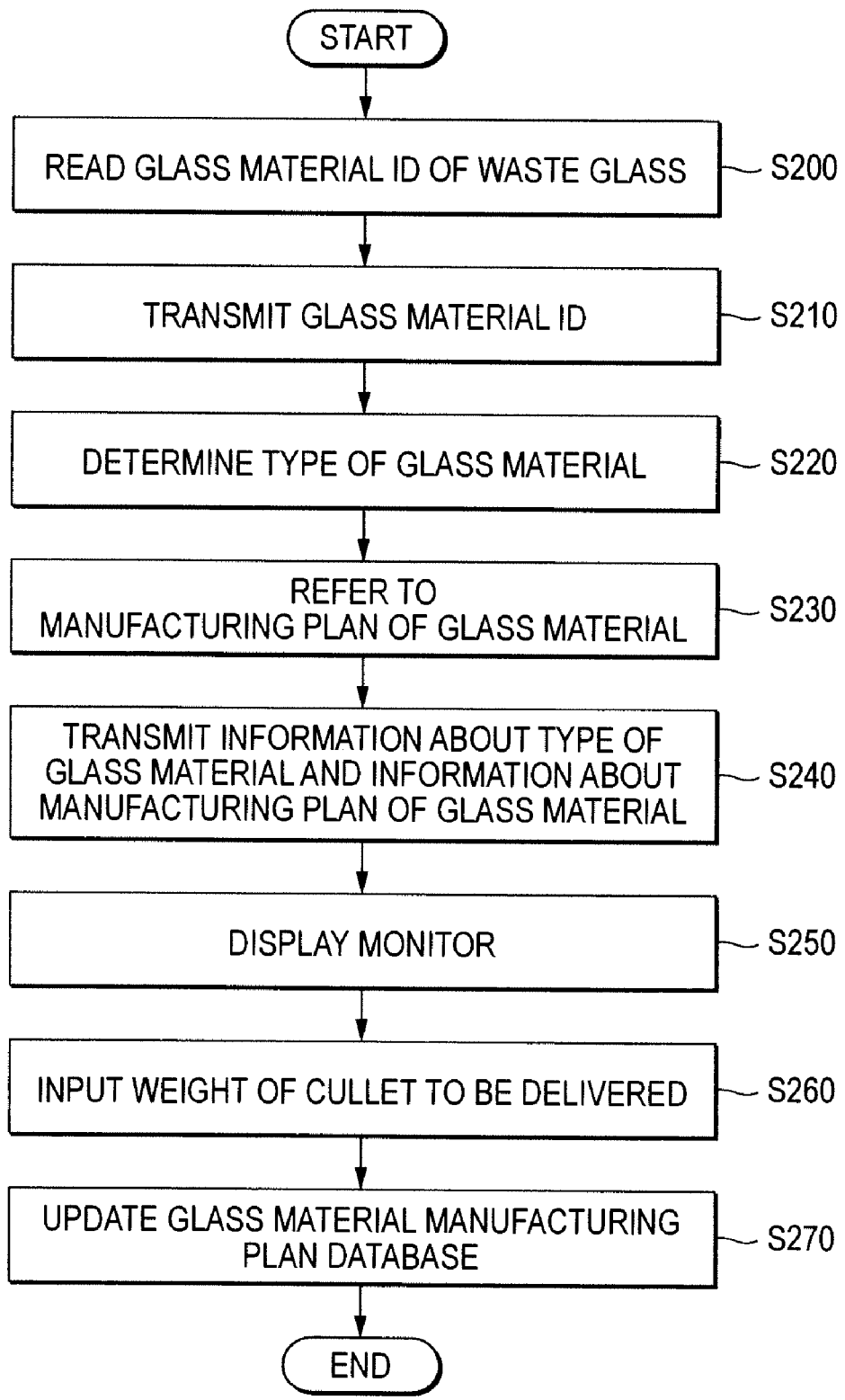
FIG. 11 is a flow chart showing a process of recycling discarded glass.

FIG. 11 is a flow chart showing the process for recycling discarded glass.

When waste glass is delivered to the recycling producer 50, the reader 140 reads the glass material ID recorded in the IC tag attached to the waste glass (S200). The read glass material ID is transmitted to the terminal equipment 130 of the recycling producer, and the terminal equipment 130 transmits the received glass material ID to the device 120 for recycling glass (S120).

The device 120 for recycling glass determines the type of glass material of the received glass material ID, using the glass material database 125 as the reference (S220). Further, the device 120 reads the information about the manufacturing plan of the glass material whose type has been determined, using the glass material manufacturing plan database 126 as a reference (S230). To be more specific, the device 120 for recycling glass obtains the weight of required cullet and a desired deadline from the glass material manufacturing plan database 126. The weight of cullet required for manufacturing a specific glass material can be obtained by, for example, a difference between the total weight of the required cullet and the weight of the ensured cullet, in the case of laminated glass A as described in FIG. 7.

The device 120 for recycling glass transmits to the terminal equipment 130 of the recycling producer the type of the specific glass material, the amount of cullet required for manufacturing the specific glass material, and the desired deadline (S240).

The terminal equipment 130 of the recycling producer displays on a monitor screen the type of specific glass material transmitted from the device 120, the weight of cullet required for manufacturing the specific glass material, and the desired deadline (S250). In this way, the recycling producer 50 is notified of the type of waste glass that cannot be determined by only its appearance, so that the recycling producer 50 can properly and quickly classify and separate waste glass. In the case of the glass material formed by combining glass material and resin material, such as laminated glass and encapsulated tempered glass, not only the glass material but also the resin material can be properly and quickly classified and separated according to the type of glass material. Furthermore, the recycling producer 50 can plan when to produce cullet in accordance with the desired deadline, which leads to a better management of recycling glass.

The recycling producer 50 estimates the weight of cullet to produce, based on the weight of collected waste glass. The weight of cullet to produce is estimated by multiplying the weight of waste glass by a predetermined coefficient less than 1, while taking into account the amount of scrap generated during a process of pulverizing the waste glass. The weight of cullet estimated by the recycling producer 50 is input by using the input unit 133 (S260). The recycling producer 50 classifies and separates waste glass, based on the type of glass material displayed on the monitor screen, and then delivers cullet generated from the waste glass to the manufacturer 20 by the desired deadline.

The terminal equipment 130 of the recycling producer transmits to the device 120 for recycling glass the weight of cullet estimated by the recycling producer 50. The device 120 registers the transmitted weight of cullet in the waste material manufacturing plan database 126 as a delivery-completed raw material (S270). In this way, the weight of cullet to be delivered is exactly calculated, which leads to a better management of recycling glass.

Since the type of waste glass is determined by the above-described system for recycling glass, the recycling producer can easily classify and separate waste glass By this, it is facilitated to reuse waste glass as a part of raw materials of the glass materials that are newly produced. In addition, since waste glass is reliably classified and separated, glass materials having different composition are prevented from being mixed; therefore, the quality of glass material is improved.

In addition, since the recycling producer provides information about whether waste glass brought by the recycling producer is marketable or unmarketable, the glass material can be smoothly recycled without waste.

The application of the present invention is not limited to the above-described embodiment, it can be modified in various forms within the scope of the present invention, and thus modified examples may fall under the invention.

For example, according to the above-described embodiment, the ROM type IC tag and the writable IC tag are attached to the glass material manufactured by the manufacturer 20, an IC tag having both a read only data region and a writable data region can be used. By using the IC tag having both regions, efficiency of manufacturing glass material can be improved.

What is claimed is:

1. A support system for recycling a glass material to which an electronic tag is attached, the support system comprising:
a first storing device in which is stored information about plural types of glass materials corresponding to plural glass material identification data that are stored in electronic tags attached to glass materials;
a reading device for reading a glass material identification data from an electronic tag that is attached to a discarded glass material;
a determining device for determining a particular type of the discarded glass material based on the glass material identification data read by the reading device by referring to information about the types of glass materials stored in the first storing device; and
a displaying device for displaying the type of the discarded glass material.

2. A support system for recycling a glass material, according to claim 1, wherein the glass materials are for a window glass of an automobile.

3. A support system for recycling a glass material, comprising:
a first storing device for storing information about plural types of glass materials corresponding to plural glass material identification data that are stored in electronic tags attached to glass materials;
a reading device for reading a glass material identification data from an electronic tag that is attached to a discarded glass material;
a determining device for determining a particular type of the discarded glass material based on the glass material identification data read by the reading device by referring to information about the types of glass materials stored in the first storing device;
a displaying device for displaying the type of the discarded glass material;
a second storing device for storing a manufacturing plan of the glass materials which contains demand information on cullets that are used as raw materials of the glass materials;
an obtaining device for obtaining a demand information on a cullet that is used as a raw material in the particular type of the discarded glass material by referring to the second storing device; and
a displaying device for displaying the demand information on the cullet to be produced from the particular type of the discarded glass material.

4. A support system for recycling a glass material, according to claim 3, further comprising:
a displaying device for displaying a weight of a required cullet as the demand information of the cullet to be produced from the particular type of the discarded glass material;
an inputting device for inputting the weight of the cullet to be produced from the particular type of the discarded glass material; and an updating device for updating the weight of the required cullet based on the weight of the cullet to be produced in the second storing device, wherein the second storing device stores weights of required cullets that are to be delivered for each of the glass materials.

5. A support system for recycling a glass material, comprising:

a first storing device for storing information about plural types of glass materials corresponding to plural glass material identification data that are stored in electronic tags attached to glass materials;

a reading device for reading a glass material identification data from an electronic tag that is attached to a discarded glass material;

a determining device for determining a particular type of the discarded glass material based on the glass material identification data read by the reading device by referring to information about the types of glass materials stored in the first storing device;

a displaying device for displaying the type of the discarded glass material;

a displaying device for displaying when a cullet should be delivered as a demand information of the cullet to be produced from the particular type of the discarded glass material, wherein a second storing device stores when the cullet should be delivered for each of the glass materials.

6. A support system for recycling a glass material, comprising:

a first storing device for storing information about plural types of glass materials corresponding to plural glass material identification data that are stored in electronic tags attached to glass materials;

a reading device for reading a glass material identification data from an electronic tag that is attached to a discarded glass material;

a determining device for determining a particular type of the discarded glass material based on the glass material identification data read by the reading device by referring to information about the types of glass materials stored in the first storing device;

a displaying device for displaying the type of the discarded glass material;

a receiving device for receiving an information about a manufacturing plan for each of the glass materials; and an updating device for updating a demand information by a cullet that is used as a raw material in a second storing device, based on the information about the manufacturing plan received by the receiving device.

7. A method of recycling a glass material to which an electronic tag is attached, comprising:

storing, within a first storing device, information about plural types of glass materials corresponding to plural glass material identification data that are stored in electronic tags attached to glass materials;

reading, performed by a reading device, a glass material identification data from an electronic tag that is attached to a discarded glass material;

determining, performed by a determining device, a particular type of the discarded glass material based on the glass material identification data read by the reading device by referring to information about the types of glass materials stored in the first storing device; and displaying, by a displaying device, the type of the discarded glass material.

* * * * *